US008885374B2

(12) United States Patent
Zhang et al.

(10) Patent No.: US 8,885,374 B2
(45) Date of Patent: Nov. 11, 2014

(54) MULTILEVEL CONVERTER AND TOPOLOGY METHOD THEREOF

(75) Inventors: Di Zhang, Albany, NY (US); Luis José Garcés Rivera, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 334 days.

(21) Appl. No.: 13/429,875

(22) Filed: Mar. 26, 2012

(65) Prior Publication Data

US 2013/0249322 A1 Sep. 26, 2013

(51) Int. Cl.
*H02M 7/537* (2006.01)

(52) U.S. Cl.
USPC .......................................................... 363/131

(58) Field of Classification Search
CPC ......... H02M 7/537; H02M 3/22; H02M 3/24; H02M 3/34; H02M 2007/4835
USPC ............................. 363/56.01, 56.02, 131, 132
See application file for complete search history.

(56) References Cited

U.S. PATENT DOCUMENTS

| 6,480,403 | B1 | 11/2002 | Bijlenga |
| 6,969,967 | B2 * | 11/2005 | Su ................................. 318/801 |
| 7,755,918 | B2 | 7/2010 | Barbosa et al. |
| 7,817,451 | B2 | 10/2010 | Barbosa et al. |
| 2007/0025126 | A1 | 2/2007 | Barbosa et al. |
| 2007/0235293 | A1 | 10/2007 | Steimer et al. |

FOREIGN PATENT DOCUMENTS

WO 2011124260 A1 10/2011

OTHER PUBLICATIONS

ABB Review, The corporate technical journal, vol. 1, No. 11, Apr. 2011, pp. 1-80.
S.H. Hosseini et al., "Estimation of Flying Capacitors Voltages in Multicell Converters," IEEE 6th. International Conference ECTI-CON, May 6-9, 2009, vol. 1, pp. 110-113.
H. Joshi et al., Implementation of a Five-Level Inverter Using Reversing Voltage Topology: A Competitive Solution for High-Power IM Drive Applications, National Power Electronics Conference 2010, pp. 1-8, 2010.
B. Reznikov et al., "Six-Level Single-Leg Flying Capacitor Converter Voltage Balancing Dynamics Analysis," 14th International Power Electronics and Motion Control Conference, Sep. 6-8, 2010, pp. T2-7-T2-14.
S.A. Khajehoddin et al., "Modeling and Analysis of 5-Level Diode-Clamped and Flying-Capacitors Converters," IEEE ISIE 2006, Jul. 9-12, 2006, pp. 1408-1413.
A. Shukla et al., "Hysteresis Current Control Operation of Flying Capacitor Multilevel Inverter and Its Application in Shunt Compensation of Distribution Systems," IEEE Transactions on Power Delivery, vol. 22, No. 1, Jan. 2007.
O. Sivkov, "Practical Results of a Five-level Flying Capacitor Inverter," ACTa POLYTECHNICa, vol. 50, No. 6, 2010, pp. 74-80.

* cited by examiner

*Primary Examiner* — Adolf Berhane
*Assistant Examiner* — Yemane Mehari
(74) *Attorney, Agent, or Firm* — Ann M. Agosti

(57) ABSTRACT

A multilevel converter includes at least one phase. Each phase of the multilevel converter includes a direct current (DC) link, a first circuit, a second circuit, and a phase capacitor. The DC link includes a first capacitor, a second capacitor, and a third capacitor situated between the first and second capacitors. The first circuit is electrically coupled to two terminals of the first capacitor. The second circuit is electrically coupled to two terminals of the second capacitor. The phase capacitor is electrically coupled between the first circuit and the second circuit.

20 Claims, 5 Drawing Sheets

MULTILEVEL CONVERTER AND TOPOLOGY METHOD THEREOF

BACKGROUND

The described embodiments relate generally to the field of conversion of direct current (DC) to alternating current (AC) and vice versa, and more specifically, relate to converters (inverters and rectifiers) that are multilevel.

Such power conversion equipment is particularly useful for renewable power generation systems such as wind and solar power generation systems. Generally a wind turbine includes a rotor that includes a rotatable hub assembly having multiple blades that transform wind energy into a mechanical rotational torque that drives one or more electrical generators via the rotor. With the rapid growth of grid-connected renewable power generation systems, renewable power penetration into the power grid may have a significant impact on the grid voltage and frequency. It is desirable to regulate the voltage and frequency of the AC power at the output of the power generation system. In wind turbine embodiments, one or more power converters are coupled to the generator to convert the power to provide power with an appropriate frequency and voltage for the utility grid.

FIG. 1 shows a phase (or leg) of a conventional active neutral point clamped five-level (ANPC-5L) converter 10. The phase of the ANPC-5L converter 10 includes a DC link 12, a first cell 14, a second cell 16, a third cell 18, and a phase capacitor (also called flying capacitor) $c_{ph}$. The DC link 12 includes a first capacitor c1 and a second capacitor c2. The first cell 14 includes a first switching element s1, a second switching element s2, a third switching element s3, and a fourth switching element s4. The second cell 16 includes a fifth switching element s5 and a sixth switching element s6. The third cell 18 includes a seventh switching element s7 and an eighth switching element s8. The switching elements s1-s8 comprise insulated gate bipolar transistors (IGBTs) in one example.

In the ANPC-5L converter 10, the phase capacitor $c_{ph}$ is kept charged to half the voltage of the first capacitor c1 or the second capacitor c2 in the DC link. As the voltage of each capacitor c1 and c2 is typically equal, the phase capacitor $c_{ph}$ is thus charged to one quarter of the total DC-link voltage $V_{dc}$. The number of output phase voltage levels of the converter 10 will be determined by switching different combinations of all of the switching elements s1-s8. The following table shows the output voltage $V_{an}$ of the converter 10 based on different combinations of the switching elements s1-s8 wherein 1 indicates a switching element being conducting and 0 indicates a switching element being non-conducting.

| s1 | s2 | s3 | s4 | s5 | s6 | s7 | s8 | $V_{an}$ | vector |
|---|---|---|---|---|---|---|---|---|---|
| 0 | 1 | 0 | 1 | 0 | 1 | 0 | 1 | −V | V0 |
| 0 | 1 | 0 | 1 | 0 | 1 | 1 | 0 | −V/2 | V1 |
| 0 | 1 | 0 | 1 | 1 | 0 | 0 | 1 | −V/2 | V2 |
| 0 | 1 | 0 | 1 | 1 | 0 | 1 | 0 | 0 | V3 |
| 1 | 0 | 1 | 0 | 0 | 1 | 0 | 1 | 0 | V4 |
| 1 | 0 | 1 | 0 | 0 | 1 | 1 | 0 | V/2 | V5 |
| 1 | 0 | 1 | 0 | 1 | 0 | 0 | 1 | V/2 | V6 |
| 1 | 0 | 1 | 0 | 1 | 0 | 1 | 0 | V | V7 |

According to above table, the output voltage $V_{an}$ of the converter 10 may comprise eight voltage vectors V0-V7 in five voltage levels (−V, −V/2, 0, +V/2, +V). For example, when the switching elements s2, s4, s6, s8 are turned on and the switching elements s1, s3, s5, s7 are turned off, the output voltage $V_{an}$ is equal to −V (see the bold path in FIG. 1). The other levels may be calculated in a similar manner.

Even though the conventional ANPC-5L converter 10 is successful in converting DC to AC (or AC to DC), the selection of the voltage of the phase capacitor $c_{ph}$ is limited. Furthermore, the power rating of the conventional ANPC-5L converter 10 may be not optimal, which can increase costs by requiring additional high voltage devices, such as additional high voltage switching elements.

Therefore, it is desirable to provide a new multilevel power source converter topology configuration to increase the selection of the phase capacitor and reduce costs of using high voltage devices while maintaining a high efficiency and generating waveforms of high quality.

BRIEF DESCRIPTION

In accordance with one embodiment disclosed herein, a multilevel converter is provided. Each phase of the multilevel converter includes a direct current (DC) link, a first circuit, a second circuit, and a phase capacitor. The DC link includes a first capacitor, a second capacitor, and a third capacitor situated between the first and second capacitors. The first circuit is electrically coupled to two terminals of the first capacitor. The second circuit is electrically coupled to two terminals of the second capacitor. The phase capacitor is electrically coupled between the first circuit and the second circuit.

In accordance with another embodiment disclosed herein, a topology method for configuring each phase of a multilevel converter is provided. The method includes providing a direct current (DC) link comprising a first capacitor, a second capacitor, and a third capacitor between the first and second capacitors; electrically coupling a first circuit to two terminals of the first capacitor; electrically coupling a second circuit to two terminals of the second capacitor; and electrically coupling a phase capacitor between the first and second circuits.

In accordance with yet another embodiment disclosed herein, a wind power generation system is provided. The wind power generation system includes a wind turbine and a multilevel converter. The wind turbine includes a rotor, a generator, and a DC-DC converter. The multilevel converter includes at least one phase. Each phase includes a DC link, a first circuit, a second circuit, and a phase capacitor. The DC link is electrically coupled to the DC-DC converter of the wind power generation system. The DC link includes a first capacitor, a second capacitor, and a third capacitor situated between the first and second capacitors. The first circuit is electrically coupled to two terminals of the first capacitor. The second circuit is electrically coupled to two terminals of the second capacitor. The phase capacitor is electrically coupled between the first circuit and the second circuit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments disclosed herein relate generally to power conversion systems with improved topology configurations. For purposes of illustration, embodiments described herein are based on multilevel voltage source converter (VSC) control systems which can provide multilevel voltage outputs by controlling switching elements in the voltage source converters, and the disclosed topology configurations include supplementary capacitors to increase the selection of the voltage of a phase capacitor and use less high voltage switching elements to reduce costs, while maintaining a high efficiency and generating waveforms of high quality.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean any one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or reactive and are connected or otherwise coupled together (e.g., as one or more integrated circuit chips) to provide the described function.

Figure 2:
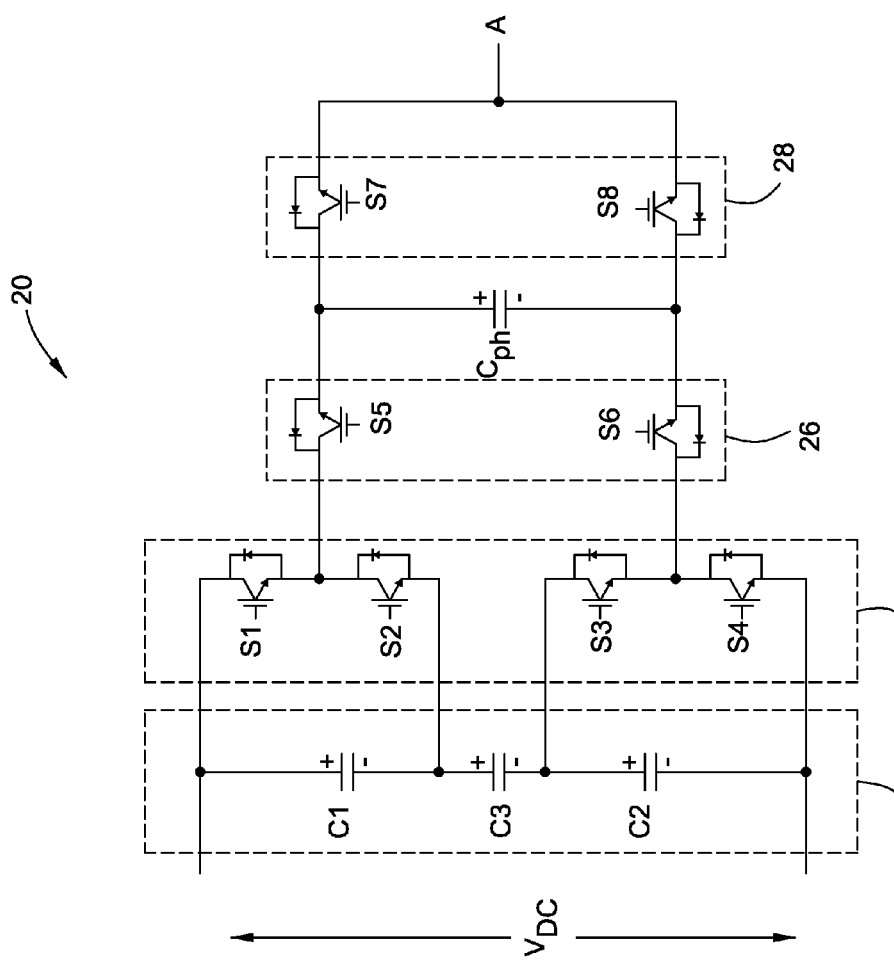
FIG. 2 is a circuit diagram of a phase of a multilevel converter in accordance with one embodiment disclosed herein.

FIG. 2 shows a circuit diagram of a phase of a multilevel converter 20 in accordance with one embodiment. The phase of the converter 20 includes a DC link 22, a first cell 24, a second cell 26, a third cell 28, and a phase capacitor $C_{ph}$. The DC link 22 (namely a separate and electrically isolated DC source (SDCS), such as directly or indirectly coupled to a wind turbine generator, a battery, an isolated power supply, a photovoltaic array, or the like) includes a first capacitor C1, a second capacitor C2, and a third capacitor C3. The first cell 14 includes a first switching element S1, a second switching element S2, a third switching element S3, and a fourth switching element S4. The second cell 16 includes a fifth switching element S5 and a sixth switching element S6. The third cell 18 includes a seventh switching element S7 and an eighth switching element S8.

In one embodiment, the switching elements S1-S8 comprise isolated gate bipolar transistors (IGBTs). Parasitic diodes, implicitly present due to the nature of the IGBTs, are illustrated to indicate the direction of bias of the transistors, namely reverse bias, such that the transistors behave as switches and not as short circuits. While the drawings illustrate the switching elements as IGBTs, it should be noted that other types of switching elements are possible such as relays, bipolar junction transistors (BJTs), and MOSFETS, for example.

Figure 3:
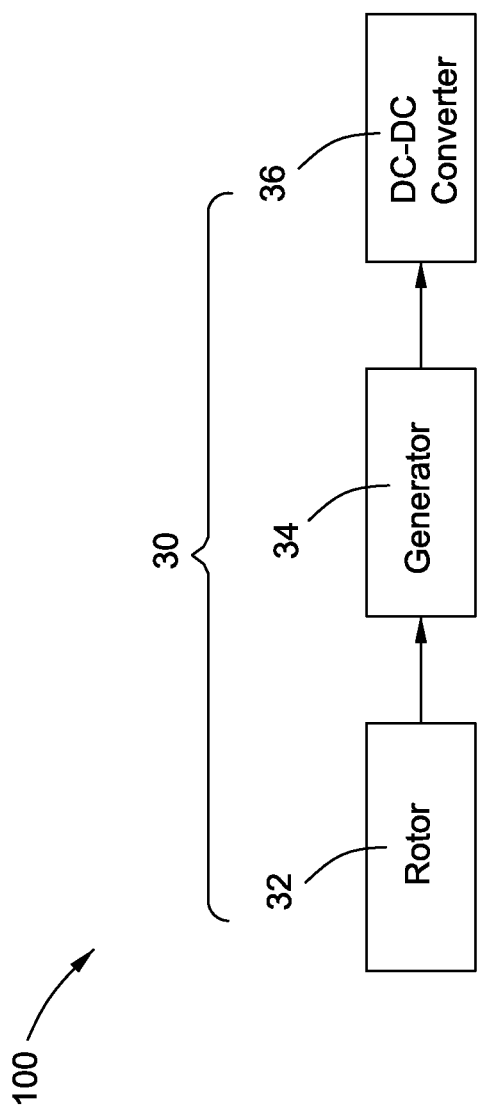
FIG. 3 is a block diagram showing an implementation for the DC link of the multilevel converter of FIG. 2 used in a wind power generation system.

Referring to FIG. 3, a block diagram of a wind power generation system 100 is shown. The wind power generation system 100 includes a wind turbine 30 used to generate DC power to be converted to AC power through the multilevel converter 20 of FIG. 2. For ease of illustration, FIG. 3 shows a portion but not the entirety of the wind power generation system 100. The wind turbine 30 may include a rotor 32, a generator 34, and a DC-DC converter 36. In one embodiment, the separate DC-DC converter 36 acts as the DC link 22 or is coupled to provide power to the DC link 22 of the multilevel converter 20. In other embodiments, the DC link 22 of the multilevel converter 20 also can be used in other kind of power generation systems, such as solar power generation systems, for example.

With continued reference to FIG. 2, the first capacitor C1, the third capacitor C3, and the second capacitor C2 are electrically coupled in series in that order. The first switching element S1 and the second switching element S2 are electrically coupled in series and then as a group are electrically coupled to the first capacitor C1 in parallel. The third switching element S3 and the fourth switching element S4 are electrically coupled in series and then as a group are electrically coupled to the second capacitor C2 in parallel. The fifth switching element S5 and the seventh switching element S7 are electrically coupled in series and then as a group are electrically coupled between a node between the first switching element S1 and the second switching element S2 and an output terminal A. The sixth switching element S6 and the eighth switching element S8 are electrically coupled in series and then as a group are electrically coupled between a node between the third switching element S3 and the fourth switching element S4 and the output terminal A.

The phase capacitor $C_{ph}$ is electrically coupled between a node between the fifth switching element S5 and the seventh switching element S7 and a node between the sixth switching element S6 and the eighth switching element S8. In other words, the first switching element S1, the second switching element S2, the fifth switching element S5, and the seventh switching element S7 together act as a first circuit electrically coupled to two terminals of the first capacitor C1. The third switching element S3, the fourth switching element S4, the sixth switching element S6, and the eighth switching element S8 together act as a second circuit electrically coupled to two terminals of the second capacitor C2. That is the phase capacitor $C_{ph}$ is electrically coupled between the first circuit and the second circuit. In other embodiments, the phase capacitor $C_{ph}$ can be electrically coupled between the first circuit and the second circuit at other appropriate nodes.

Figure 1:
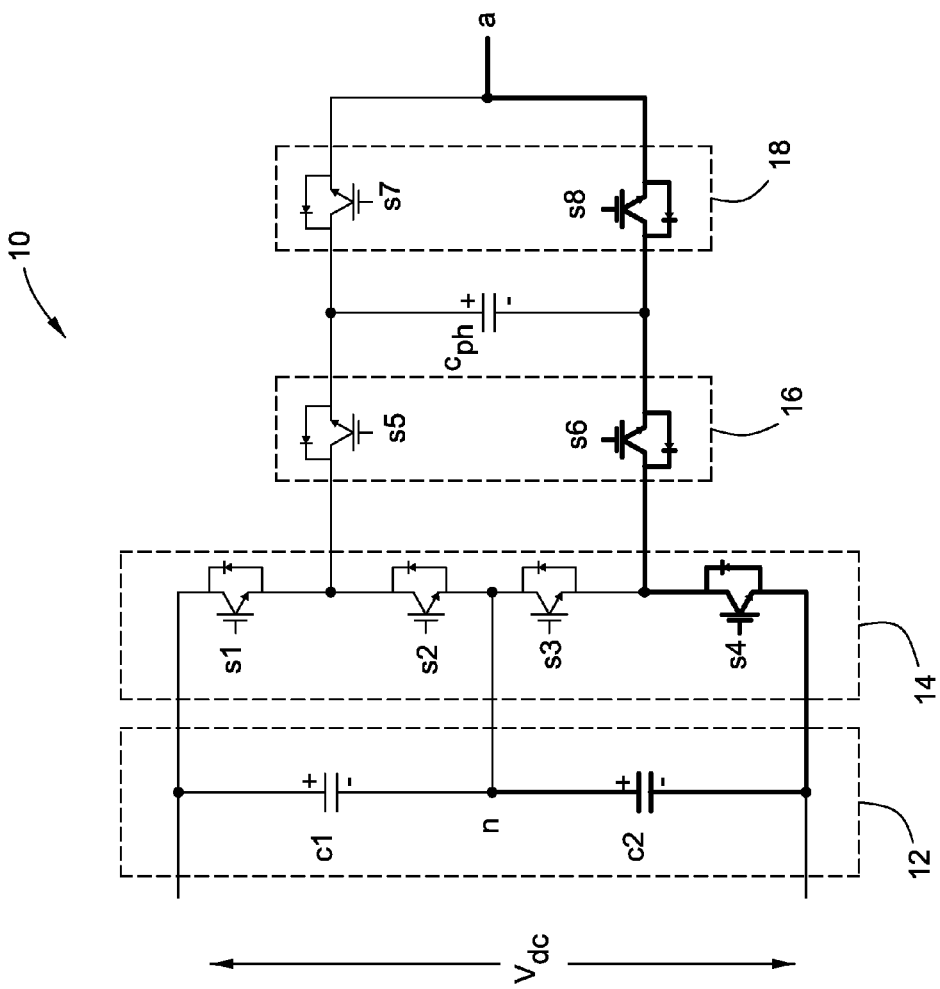
FIG. 1 is a circuit diagram of a phase of a conventional active neutral point clamped five-level converter.

Compared with the conventional active neutral point clamped five-level (ANPC-5L) converter 10 shown in FIG. 1, the converter 20 of FIG. 2 further provides a supplementary capacitor C3 to segment two circuit parts respectively electrically coupled to the first capacitor C1 and the second capacitor C2, and provide a supplementary voltage selection between the first capacitor C1 and the second capacitor C2. Thus, the selection of the voltage of the phase capacitor $C_{ph}$ can be increased accordingly.

Figure 4:
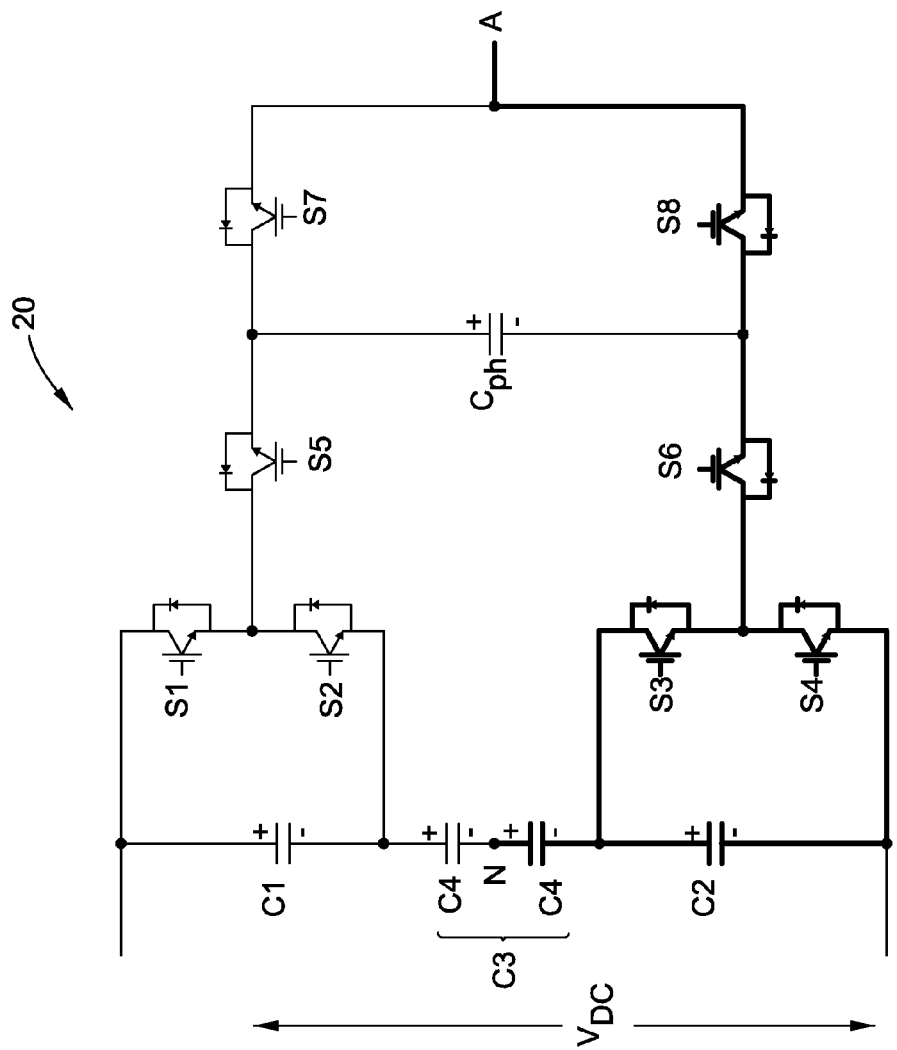
FIG. 4 is an equivalent circuit diagram of FIG. 2.

Referring to FIG. 4, for ease of explaining the implementation of the converter 20 of FIG. 2, the third capacitor C3 in FIG. 3 is divided into two identical fourth capacitors C4, and a virtual input terminal N is defined between the two fourth capacitors C4 corresponding to the output terminal A. When defining the voltage of the first capacitor C1 to be V1, the voltage of the second capacitor C2 to be V2, the voltage of the third capacitor C3 to be V3, the voltage of the fourth capacitor C4 to be V4, and the voltage the phase capacitor $C_{ph}$ as $V_{ph}$, then V3=2*V4. The following table shows the output voltage $V_{AN}$ of the converter 20 based on different combinations of the switching elements S1-S8 wherein 1 indicates a switching element being conducting and 0 indicates a switching element being non-conducting.

| S1 | S2 | S3 | S4 | S5 | S6 | S7 | S8 | $V_{AN}$ | vector |
|----|----|----|----|----|----|----|----|----------|--------|
| 0  | 1  | 0  | 1  | 0  | 1  | 0  | 1  | −V2 − V4 | V0 |
| 0  | 1  | 0  | 1  | 0  | 1  | 1  | 0  | $V_{ph}$ − V2 − V4 | V1 |
| 0  | 1  | 0  | 1  | 1  | 0  | 0  | 1  | V4 − $V_{ph}$ | V2 |
| 0  | 1  | 0  | 1  | 1  | 0  | 1  | 0  | V4 | V3 |
| 1  | 0  | 1  | 0  | 0  | 1  | 0  | 1  | −V4 | V4 |
| 1  | 0  | 1  | 0  | 0  | 1  | 1  | 0  | $V_{ph}$ − V4 | V5 |
| 1  | 0  | 1  | 0  | 1  | 0  | 0  | 1  | V1 + V4 − $V_{ph}$ | V6 |
| 1  | 0  | 1  | 0  | 1  | 0  | 1  | 0  | V1 + V4 | V7 |

According to above table, the output voltage $V_{AN}$ of the converter 20 may comprise eight voltage vectors V0-V7 in eight levels or less. For example, when the switching elements S2, S4, S6, S8 are turned on and the switching elements S1, S3, S5, S7 are turned off, the output voltage $V_{AN}$ is equal to −V2−V4 (see the bold path in FIG. 4). The other levels may be calculated in a similar manner. The output voltage $V_{AN}$ of the converter 20 can be modified by adjusting the selection of the voltage of the phase capacitor $C_{ph}$.

In one embodiment, assume $V_{ph}$=V4 and V1=V2. Then the output voltage $V_{AN}$ of the converter 20 outputs seven voltage levels which respectively are −V1−V4, −V1, −V4, 0, V4, V1, and V1+V4 based on the above table. In another embodiment, assume $V_{ph}$=V4, V1=V2, and V1=V4. Then five voltage levels can be output which respectively are −2V1, −V1, 0, V1, and 2V1. In other embodiments, the number of voltage levels can be adjusted by setting different voltages.

In an alternative embodiment, assume $V_{ph}$=V4+V½ and V1=V2, the output voltage $V_{AN}$ of the converter 20 outputs sixth voltage levels, respectively are −V1−V4, −V½, −V4, V4, V½, and V1+V4 based on the above table. Specifically, when V4=0, the topology will become conventional ANPC-5L converter in the prior art, which can output five voltage levels, since −V4=V4=0. In other embodiments, the output voltage $V_{AN}$ of the converter 10 can output other different voltage levels by adjusting the voltage of the phase capacitor $V_{ph}$. Thus, the selection of the voltage of the phase capacitor $V_{ph}$ is flexible after providing the third capacitor C3 between the first capacitor C1 and the second capacitor C2.

Referring again to the example wherein $V_{ph}$=V4 and V1=V2, the first to eighth switching elements S1-S8 respectively should be operable at voltages of at least V1, V1, V1, V1, V4+V1, V1+V4, V4, and V4, namely the total voltages may be V1+V1+V1+V1+(V4+V1)+(V1+V4)+V4+V4= (6*V1+4*V4). In a conventional ANPC-5L converter 10, the voltage on each of the capacitors c1 and c2 can be represented as V1+V4, and the voltage on the phase capacitor $c_{ph}$ is equal to (V1+V4)/2. Thus for the conventional embodiment the eight switching elements s1-s8 respectively need to be able to withstand at least V1+V4, V1+V4, V1+V4, V1+V4, (V1+V4)/2, (V1+V4)/2, (V1+V4)/2, and (V1+V4)/2, namely the total voltages will be (V1+V4)+(V1+V4)+(V1+V4)+(V1+V4)+(V1+V4)/2+(V1+V4)/2+(V1+V4)/2+(V1+V4)/2=[6*(V1+V4)]. As [6*(V1+V4)] is greater than (6*V1+4*V4), it can be seen that switches with lower voltage ratings may be used in the embodiment of FIG. 2 than can be used in the embodiment of FIG. 1.

In an alternative embodiment, assume $V_{ph}$=V4+V½ and V1=V2. In this embodiment, the first to eighth switching elements S1-S8 are designed to be able to withstand at least V1, V1, V1, V1, V4+V½, V4+V½, V4+V½, and V4+V½, namely the total voltages will also be V1+V1+V1+V1+(V4+V½)+(V4+V½)+(V4+V½)+(V4+V½)=(6*V1+4*V4). As stated above, with conventional ANPC-5L converter 10, the total voltages will be [6*(V1+V4)]. Again, because (6*V1+4*V4)<[6*(V1+V4)], that means the topology of the converter 20 of FIG. 2 can use switching elements with lower voltage ratings than the conventional ANPC-5L converter 10 while providing the same DC bus voltage (namely 2(V1+V2)). Use of lower voltage rating switches can reduce system expense. Furthermore, because the topology of the converter 20 of FIG. 2 can output more voltage levels than conventional ANPC-5L converters, flexibility is increased.

Figure 5:
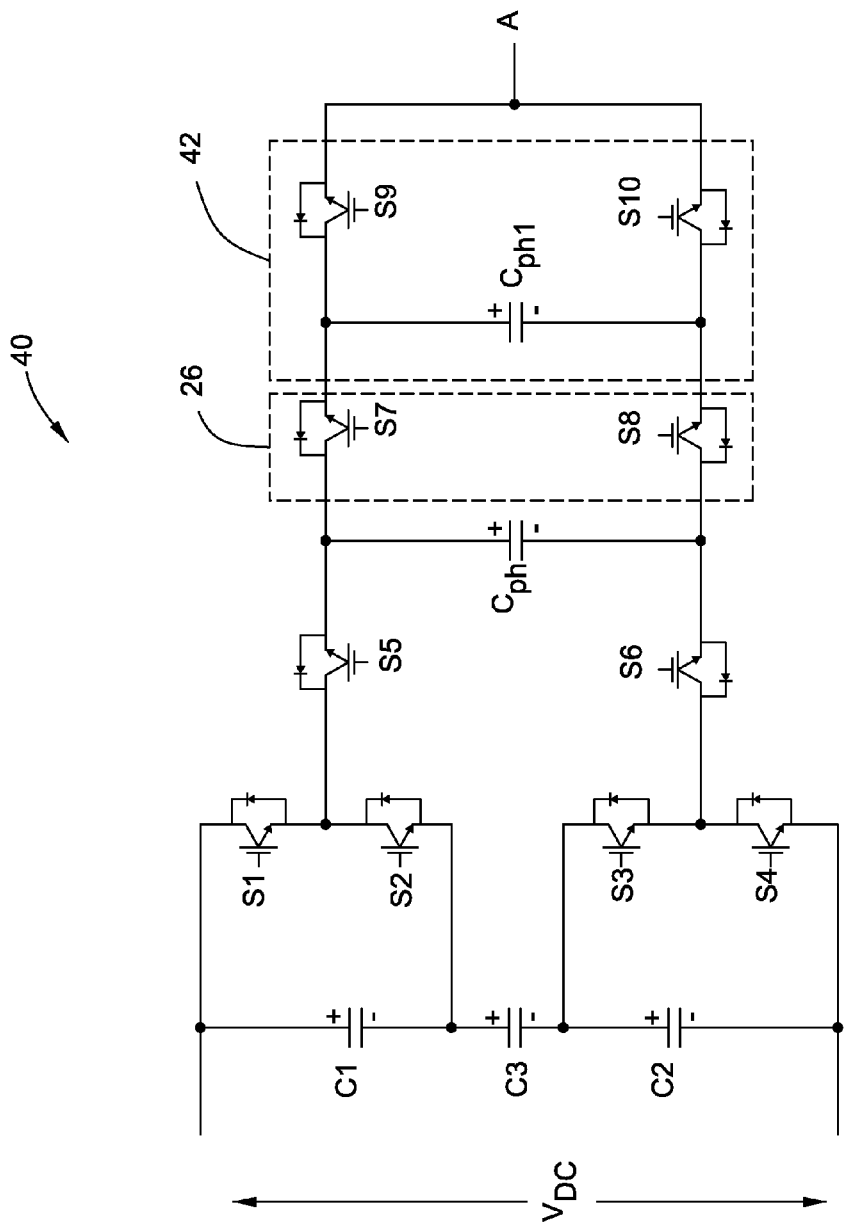
FIG. 5 is a circuit diagram of a phase of a multilevel converter in accordance with another embodiment disclosed herein.

The first cell 24, the second cell 26, and the third cell 28 may either be situated on separate substrates or integrated together on a common substrate. Furthermore, additional components may be added if desired. For example, referring to FIG. 5, a circuit diagram of a multilevel converter 40 in accordance with one embodiment is shown. The converter 40 includes a fourth cell 42 that is not present in the embodiment of FIG. 2. The fourth cell 42 includes an additional phase capacitor $C_{ph1}$, a ninth switching element S9, and a tenth switching element S10. The fourth cell 42 is introduced between the third cell 26 and the output terminal A. In particular, the ninth switching element S9 is electrically coupled between the seventh switching element S7 and the output terminal A, the tenth switching element S10 is electrically coupled between the eighth switching element S8 and the output terminal A. The additional phase capacitor $C_{ph1}$ is electrically connected between a node between the seventh switching element S7 and the ninth switching element S9 and a node between the eighth switching element S8 and the tenth switching element S10. In other embodiments, further cells may be added if desired, and the number of voltage levels may be further added due to adding additional phase capacitors and switching elements.

Although specific features of various embodiments of the invention may be shown in and/or described with respect to some drawings and not in others, this is for convenience only. It is to be understood that the described features, structures, and/or characteristics may be combined in any suitable manner in the various embodiments. Additionally, while the invention has been described with reference to exemplary embodiments, it will be understood by those skilled in the art that various changes may be made and equivalents may be substituted for elements thereof without departing from the scope of the invention. In additional, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A multilevel converter comprising:
at least one phase, each phase comprising
a direct current (DC) link comprising a first capacitor, a second capacitor, and a supplementary capacitor situated between the first and second capacitors;
a first circuit electrically coupled to two terminals of the first capacitor;
a second circuit electrically coupled to two terminals of the second capacitor, wherein the supplementary capacitor segments the first circuit and the second circuit respectively, and provides a supplementary voltage selection between the first capacitor and the second capacitor; and
a phase capacitor electrically coupled between the first circuit and the second circuit.

2. The multilevel converter of claim 1, wherein the multilevel converter is embodied in a wind power generation system.

3. The multilevel converter of claim 1, wherein the first circuit comprises a first switching element and a second switching element electrically coupled in series, and wherein the second circuit comprises a third switching element and a fourth switching element electrically coupled in series.

4. The multilevel converter of claim 3, wherein the first circuit further comprises a fifth switching element electrically coupled between a node between the first and second switching elements and a first terminal of the phase capacitor; and wherein the second circuit further comprises a sixth switching element electrically coupled between a node between the third and fourth switching elements and a second terminal of the phase capacitor.

5. The multilevel converter of claim 4, wherein the first circuit further comprises a seventh switching element electrically coupled between the first terminal of the phase capacitor and an output terminal; wherein the second circuit further comprises an eighth switching element electrically coupled between the second terminal of the phase capacitor and the output terminal.

6. The multilevel converter of claim 5, wherein the first to eighth switching elements comprise transistors with parasitic diodes that are reverse biased.

7. The multilevel converter of claim 6, wherein the transistors comprise insulated gate bipolar translators.

8. The multilevel converter of claim 5, wherein the first circuit further comprises a ninth switching element electrically coupled between the seventh switching element and the output terminal; wherein the second circuit further comprises a tenth switching element electrically coupled between the eighth switching element and the output terminal; and wherein an additional phase capacitor is electrically coupled between a node between the seventh switching element and the ninth switching element and a node between the eighth switching element and the tenth switching element.

9. A method for configuring each phase of a multilevel converter, the method comprising:
for each phase, providing a direct current (DC) link comprising a first capacitor, a second capacitor, and a supplementary capacitor between the first and second capacitors;
electrically coupling a first circuit to two terminals of the first capacitor;
electrically coupling a second circuit to two terminals of the second capacitor;
segmenting the first circuit and the second circuit through the supplementary capacitor, to provide a supplementary voltage selection between the first capacitor and the second capacitor; and
electrically coupling a phase capacitor between the first and second circuits.

10. The method of claim 9, wherein the first circuit comprises a first switching element and a second switching element electrically coupled in series across the first capacitor, and wherein the second circuit comprises a third switching element and a fourth switching element electrically coupled in series across the second capacitor.

11. The method of claim 10, further comprising:
providing a fifth switching element electrically coupled between a node between the first and second switching elements and a first terminal of the phase capacitor; and
providing a sixth switching element electrically coupled between a node between the third and fourth switching elements and a second terminal of the phase capacitor.

12. The method of claim 11, further comprising:
providing a seventh switching element electrically coupled between the first terminal of the phase capacitor and an output terminal; and
providing an eighth switching element electrically coupled between the second terminal of the phase capacitor and the output terminal.

13. The method of claim 11, further comprising:
providing a ninth switching element electrically coupled between the seventh switching element and the output terminal;
providing a tenth switching element electrically coupled between the eighth switching element and the output terminal; and
providing an additional phase capacitor electrically coupled between a node between the seventh switching element and the ninth switching element and a node between the eighth switching element and the tenth switching element.

14. A wind power generation system comprising:
a wind turbine comprising a rotor, a generator, and a DC-DC converter; and
a multilevel converter comprising at least one phase, each phase comprising:
a DC link electrically coupled to the DC-DC converter of the wind power generation system, wherein the DC link comprises a first capacitor, a second capacitor, and a supplementary capacitor situated between the first and second capacitors;
a first circuit electrically coupled to two terminals of the first capacitor;
a second circuit electrically coupled to two terminals of the second capacitor, wherein the supplementary capacitor segments the first circuit and the second circuit respectively, and provides a supplementary voltage selection between the first capacitor and the second capacitor; and
a phase capacitor electrically coupled between the first circuit and the second circuit.

15. The wind power generation system of claim 14, wherein the first circuit comprises a first switching element and a second switching element electrically coupled in series; and wherein the second circuit comprises a third switching element and a fourth switching element electrically coupled in series.

16. The wind power generation system of claim 15, wherein the first circuit further comprises a fifth switching element electrically coupled between a node between the first and second switching elements and a first terminal of the phase capacitor; and wherein the second circuit further comprises a sixth switching element electrically coupled between a node between the third and fourth switching elements and a second terminal of the phase capacitor.

17. The wind power generation system of claim 16, wherein the first circuit further comprises a seventh switching element electrically coupled between the first terminal of the phase capacitor and an output terminal; wherein the second circuit further comprises an eighth switching element electrically coupled between the second terminal of the phase capacitor and the output terminal.

18. The wind power generation system of claim 17, wherein the first to eighth switching elements comprise transistors with parasitic diodes that are reverse biased.

19. The wind power generation system of claim 18, wherein the transistors comprise insulated gate bipolar translators.

20. The wind power generation system of claim 17, wherein the first circuit further comprises a ninth switching element electrically coupled between the seventh switching element and the output terminal; wherein the second circuit further comprises a tenth switching element electrically coupled between the eighth switching element and the output terminal; wherein an additional phase capacitor is electrically coupled between a node between the seventh switching element and the ninth switching element and a node between the eighth switching element and the tenth switching element.

* * * * *